United States Patent
Zhu (10) Patent No.: US 7,577,616 B2
(45) Date of Patent: Aug. 18, 2009

(54) METHOD AND APPARATUS OF SECURE AUTHENTICATION AND ELECTRONIC PAYMENT THROUGH MOBILE COMMUNICATION TOOL

(76) Inventor: Xi Zhu, 305 N. Marguerita Ave., Apt. 20, Alhambra, CA (US) 91801

( * ) Notice: Subject to any disclaimer, the term of this patent is extended or adjusted under 35 U.S.C. 154(b) by 191 days.

(21) Appl. No.: 11/523,256

(22) Filed: Sep. 18, 2006

(65) Prior Publication Data
US 2007/0130085 A1    Jun. 7, 2007

(51) Int. Cl.
*G06F 17/60* (2006.01)
(52) U.S. Cl. ...................................................... 705/59
(58) Field of Classification Search .................... 705/59
See application file for complete search history.

(56) References Cited
U.S. PATENT DOCUMENTS
2002/0184539 A1* 12/2002 Fukuda et al. .............. 713/202

FOREIGN PATENT DOCUMENTS
JP    2001291032    * 10/2001

* cited by examiner

*Primary Examiner*—Pierre E Elisca
(74) *Attorney, Agent, or Firm*—Raymond Y. Chan; David and Raymond Patent Firm (57) ABSTRACT

The present invention relates to apparatus and method utilizing a mobile terminal as a tool for secure authentication and electronic payment. A random ID code is passed through a circle path to verify the nodes along the path. If the RID sent back matches the one generated for the current transaction, the user is authenticated and the transaction is approved for further action. The user's account server generates a Random ID code when a transaction request is received. This RID will be passed to the user's mobile terminal and then passed to the terminal where the user request access or purchasing. The terminal will send the RID back to the account server. If the RID received and the original RID generated for this transaction matches the user is authenticated. The RID can also be passed through a reverse direction.

6 Claims, 10 Drawing Sheets

| Transaction Req. Number | User Account | Mobile Phone # | Transaction Server Account ID | Charge Amount ($) | Time | RID | RID retry No. |
|---|---|---|---|---|---|---|---|
| 101 | 454575876 | 909-123-4567 | amazon_10 | 100 | 10:00PM | 3435557657 | 0 |
| 102 | 123456778 | 606-333-4567 | bestbuy | 300 | 10:10PM | 435475689 | 2 |
| 103 | ... | ... | ... | ... | ... | ... | ... |

METHOD AND APPARATUS OF SECURE AUTHENTICATION AND ELECTRONIC PAYMENT THROUGH MOBILE COMMUNICATION TOOL

BACKGROUND OF THE PRESENT INVENTION

1. Field of Invention

The present invention relates to method of secure authentication or electrical payment utilizing a random ID verification method through a mobile communication tool.

2. Description of Related Arts

Conventional methods of secure access and electronic payment require highly sophisticate method and/or equipments, such as finger print, smart card, and/or other password based security/encryption to prevent ID forgery. Even with costly software and hardware investment they are still vulnerable to some technically or non-technically stealing methods.

The practice of saving the credit or debit card information into a mobile phone is just a change of carrying media of the sensitive information. It doesn't resolve the problem of proper authentication. There are varies of ways of stealing the sensitive card or account information plus the PIN code.

Traditional internet base login and payment methods are very vulnerable to many stealing/forgery practices: account number stealing, Trojan virus, wiretapping, phishing and etc. There's a great demand of a method that's practical, secure and low cost. The method presented in this invention satisfies all the criteria.

U.S. patent application Ser. No. 10/801,470 (Publication No.: 20050208891) presents a method of generating a pseudo-random code based on time slice on a server and the mobile phone. If the server generated code matches the one generated by the mobile phone, the user's authentication is approved. This method requires a special designed mobile phone with pseudo-random number generator built in. And the server needs to keep track of all of its subscribed mobile terminals' pseudo-random numbers, as each has different number based on the different seed received. This practice is timing sensitive, so the server needs to be synchronized to the mobile phone or the mobile network all the time. And it's very possible that the user would subscribe to multiple servers for different purpose. The mobile phone would have to have many different algorithms of time-varying pseudo-random number generator built in. And the user has to choose which algorithm to use when accessing different service. And as long as there's a fixed algorithm for all subscribed mobile user and a fixed seed for each user saved in the server and the mobile phone, the security is vulnerable to some theft activity.

U.S. patent application Ser. No. 10/934,740 (Publication No.: 20030005136) presents a method of using mobile phone to pay a charge. The user first dials the number of the payment transaction server to initiate a payment transaction. The payment server verifies the subscribed user's PIN, account balance and the subscribed merchant store account. If both accounts are verified and the balance is enough the transaction will be approved. This method only applies to a payment application. And the user needs to go through tedious multiple voice-prompts to provide not only his/her account and PIN, but the merchant store account number and amount of charge. It requires both the user and the merchant store subscribed to the same service provider otherwise it will be very hard for the service provider to locate the merchant's bank account. It may be applied to a small charge merchant like vending machine and parking meter. It may not be applicable to a supermarket, in which timing of charge processing is critical. And it is not suitable and convenient for an online shopping.

Another way of using mobile phone for the authentication is the authentication server request the mobile phone send back a confirmation back after reviewing the detail of the transaction request. This method does utilize the secure mobile wireless network. But it is not user friendly and always requires human intervening. It will be discussed in the detail description of preferred embodiment.

SUMMARY OF THE PRESENT INVENTION

It is an object of the present invention to provide a simple and easy solution to implement the ID authentication and electronic payment either over the internet or by means of a physical terminal such as a kiosk.

In order to accomplish the above objects, the present invention provides a method and apparatus of the secure access and electronic payment through mobile communication tool.

The method and apparatus of the secure access and electronic payment comprises of Random ID code generation and circle path authentication. The RID can travel through one direction and return to the original point in the circle or travel from two directions and meet at one point in the circle. The RID will be check at the return or meet point.

The method and apparatus of the secure access and electronic payment through mobile communication tool comprises the steps of: (a) Service user to subscribe to a service provider with his/her mobile phone number; (b) At the beginning of a transaction, user's account number is passed to a transaction terminal; (c) The terminal transfer the user account info with the requested action to the terminal transaction server; (d) The terminal transaction server find out the user's service provider and send the user account info, transaction terminal/server account info and the transaction request to the service provider' account server; (e) The user's account server verifies both the user and transaction server's account info; (f) If both accounts are OK, the account server generate a Random ID (RID) number and send to the user's mobile terminal; (g) The account server may require a PIN from the user's mobile terminal for retrieving the RID; (h) The RID code will be passed to the transaction terminal by keyboard or through a near field wireless connection; (i) After the transaction terminal receive this RID, it will transfer it to its transaction server and then back to the account server; (j) The account server will check the RID received from the terminal with the one it sent to the mobile phone for this specific transaction; (k) If matches, the server approve the transaction and send the confirmation to both the mobile phone and the terminal.

An alternative implementation is to reverse the RID passing direction or to send the RID from two direction in a circle and back to the verification server.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

In order that the invention may be fully understood, preferred embodiments thereof will now be described with reference to the accompanying drawings.

The present invention comprises the Random ID code generation and circle path authentication. A Random ID code is generated at one point of a close circle of the transaction communication. The RID can travel through one direction and return to the original point in the circle or travel from two directions and meet at one point in the circle. At this point, the RIDs will be checked against each other. The two RIDs should be exactly the same.

Figure 1:
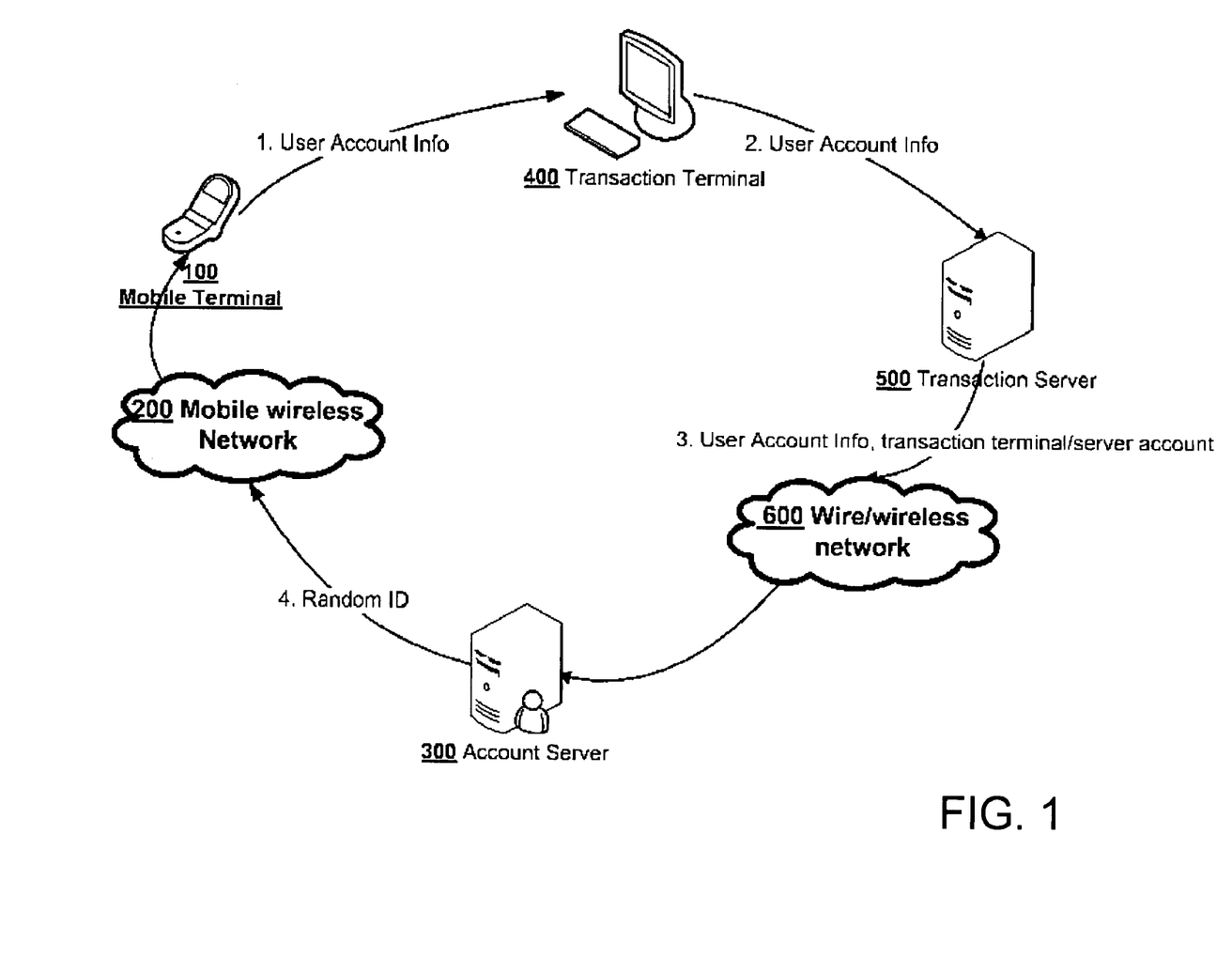
FIG. 1 is the illustration of the network of the system for ID authentication or electronic payment using mobile phone according to the present invention.

FIG. 1 is the illustration of the network of system embodying the preferred embodiment of the present invention. FIG. 1 shows the mobile terminal 100, mobile wireless network 200, user's account server 300, terminal 400, terminal transaction server 500, wire or wireless network 600 between 300 and 500. FIG. 1 also shows the path of the RID, which is generated in the account server, passed through a circle and sent back to the original account server.

Figure 2:
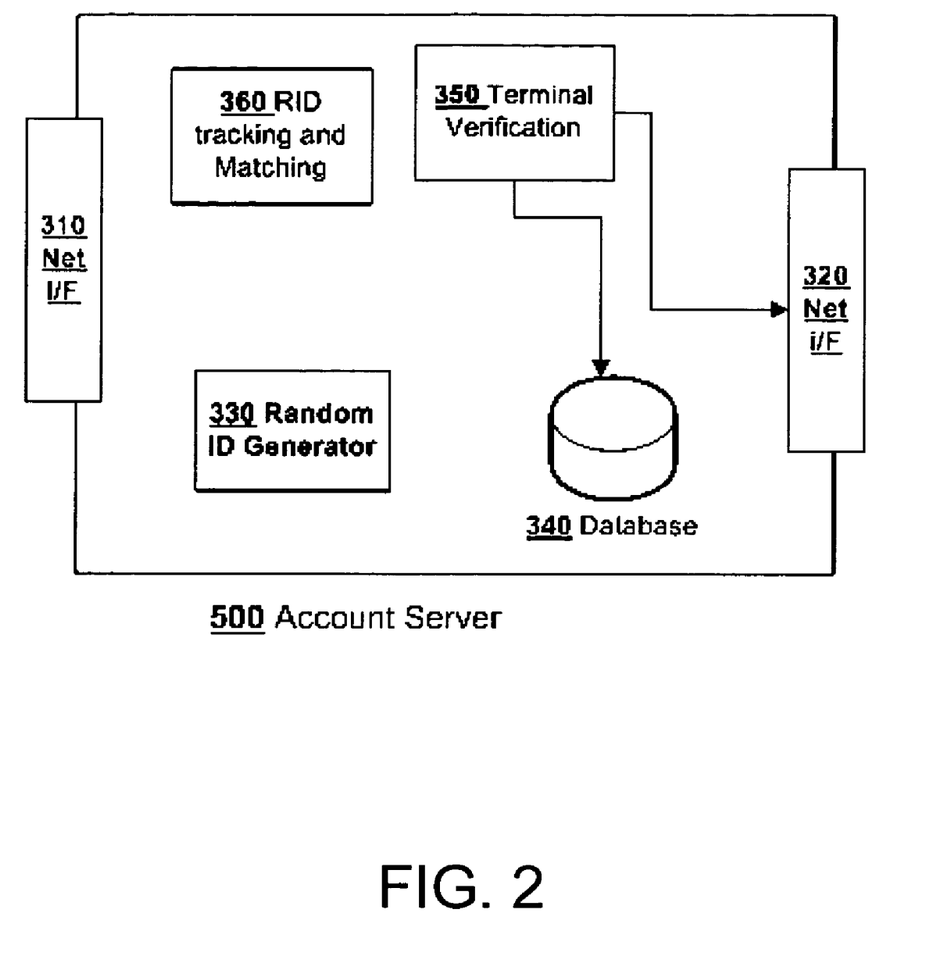
FIG. 2 is a functionality block diagram of the user's account server.

FIG. 2 is a block diagram of the user account server 300 of FIG. 1. The account server consists a network interface 310 to the mobile wireless network 200 to communicate with the mobile terminal, a network interface 320 to the network 500 to communicate with transaction server, a random ID generator 330, a database 340 containing subscribed user account information, subscribed terminal account information, transaction records and all pending transaction and their RID, a module to verify the terminal's account 340 when the terminal did not subscribed to it, a module to track and match all pending transactions' RID 350.

Figure 3:
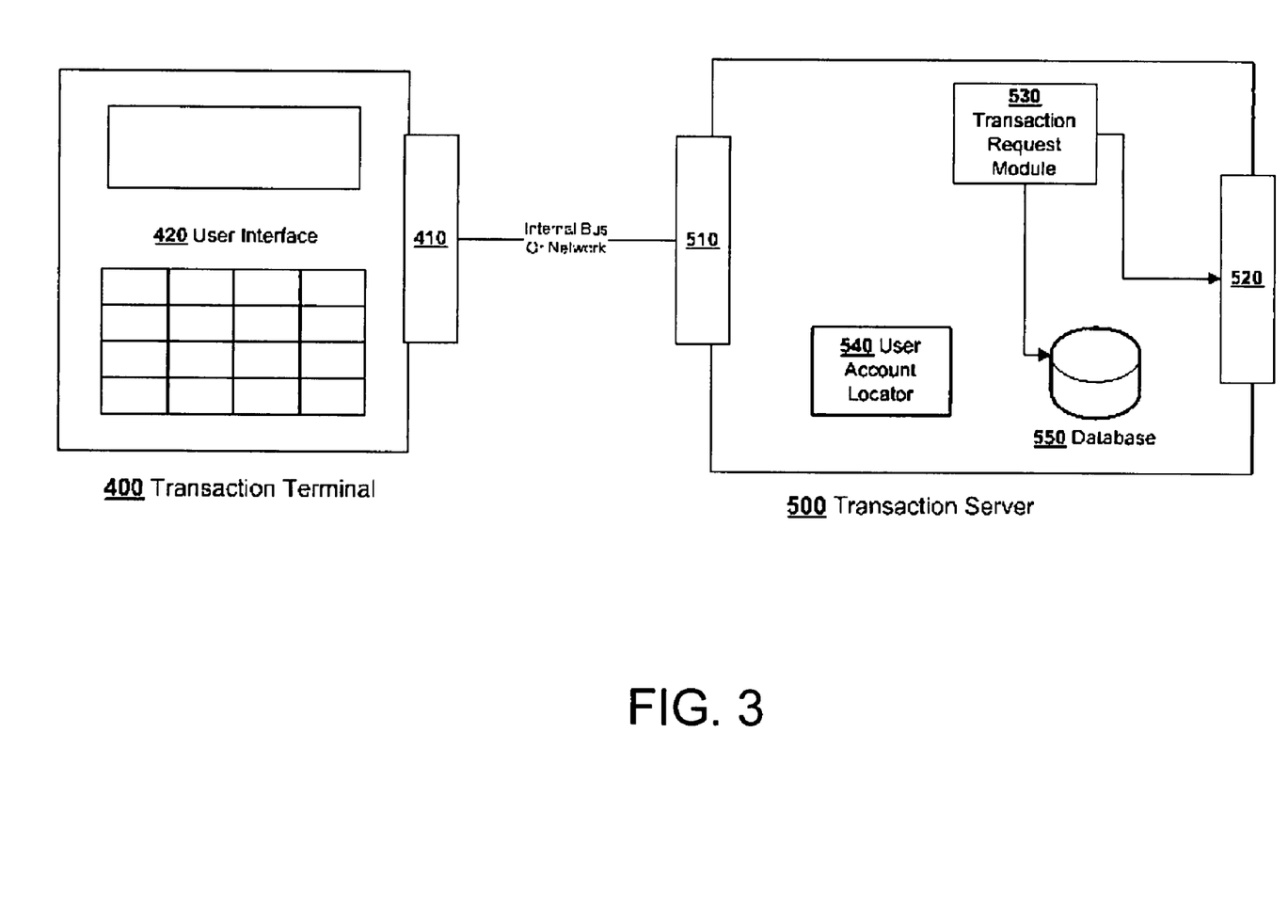
FIG. 3 is the functionality block diagram of the transaction terminal and the terminal transaction server.

FIG. 3 is a functionality block diagram of the transaction terminal 400 and the transaction server 500. The terminal server consists of an interface between the transaction terminal and transaction server 510, a network interface that communicates with the users' account server 520; a transaction request module 530 to pack the terminal account information, action request, and the user's account information and send to the user account server, a module to locate the user's account server 540, a database 550 which save the transaction records, account server information and the terminal information. The transaction terminal consists of an interface to the terminal server 410, a user interface with the user or the mobile terminal 420, which can be a keyboard, an infrared or contactless (RFID) smart card reader, a barcode reader, a web page, and etc. The connection between the transaction terminal and the terminal server can be a network connection, through which the transaction server could manage multiple terminals or an internal bus if they're physically built in the same machine.

Figure 4:
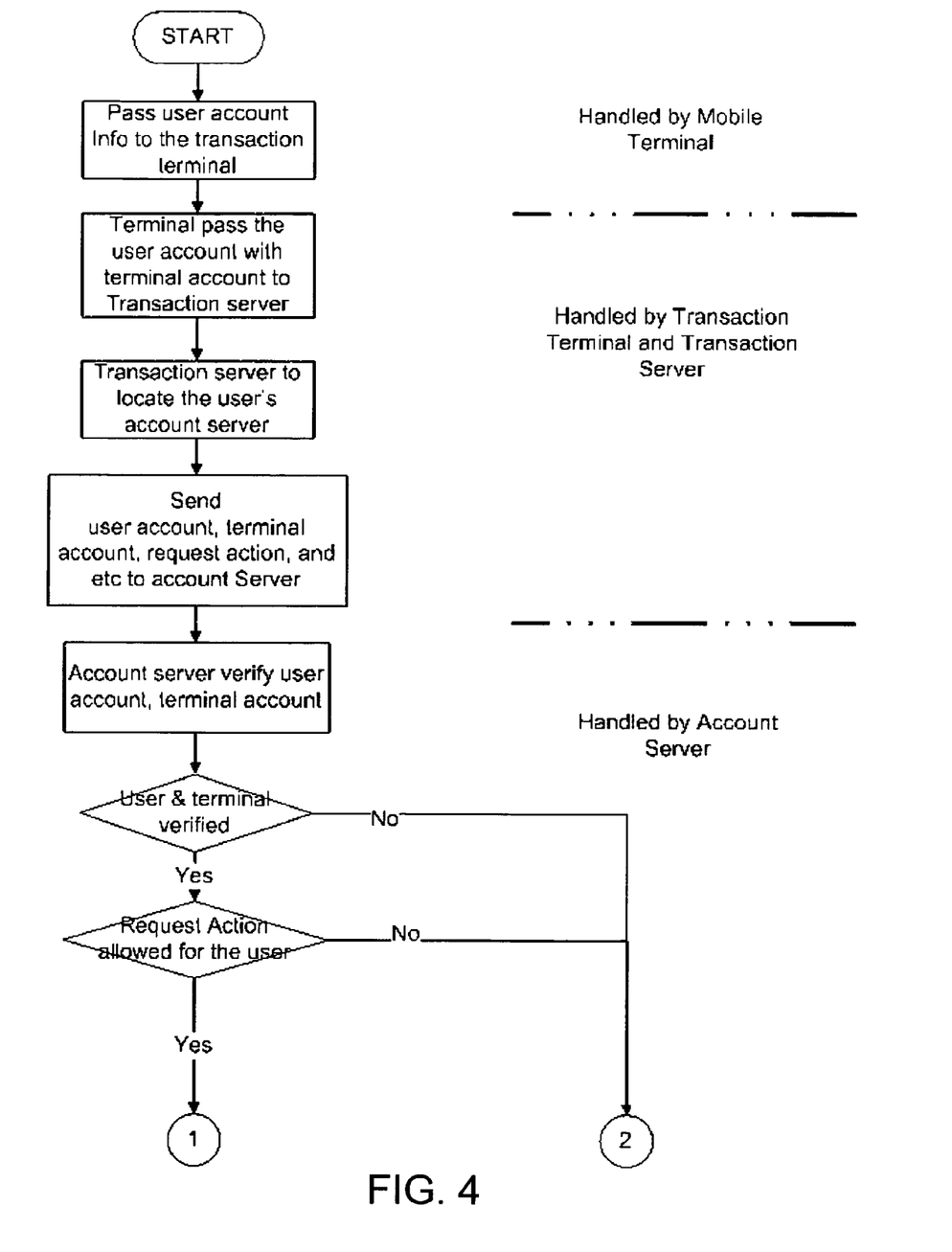
FIGS. 4 and 5 are the flow-charts depicting the sequence of the IF authentication.
Figure 5:
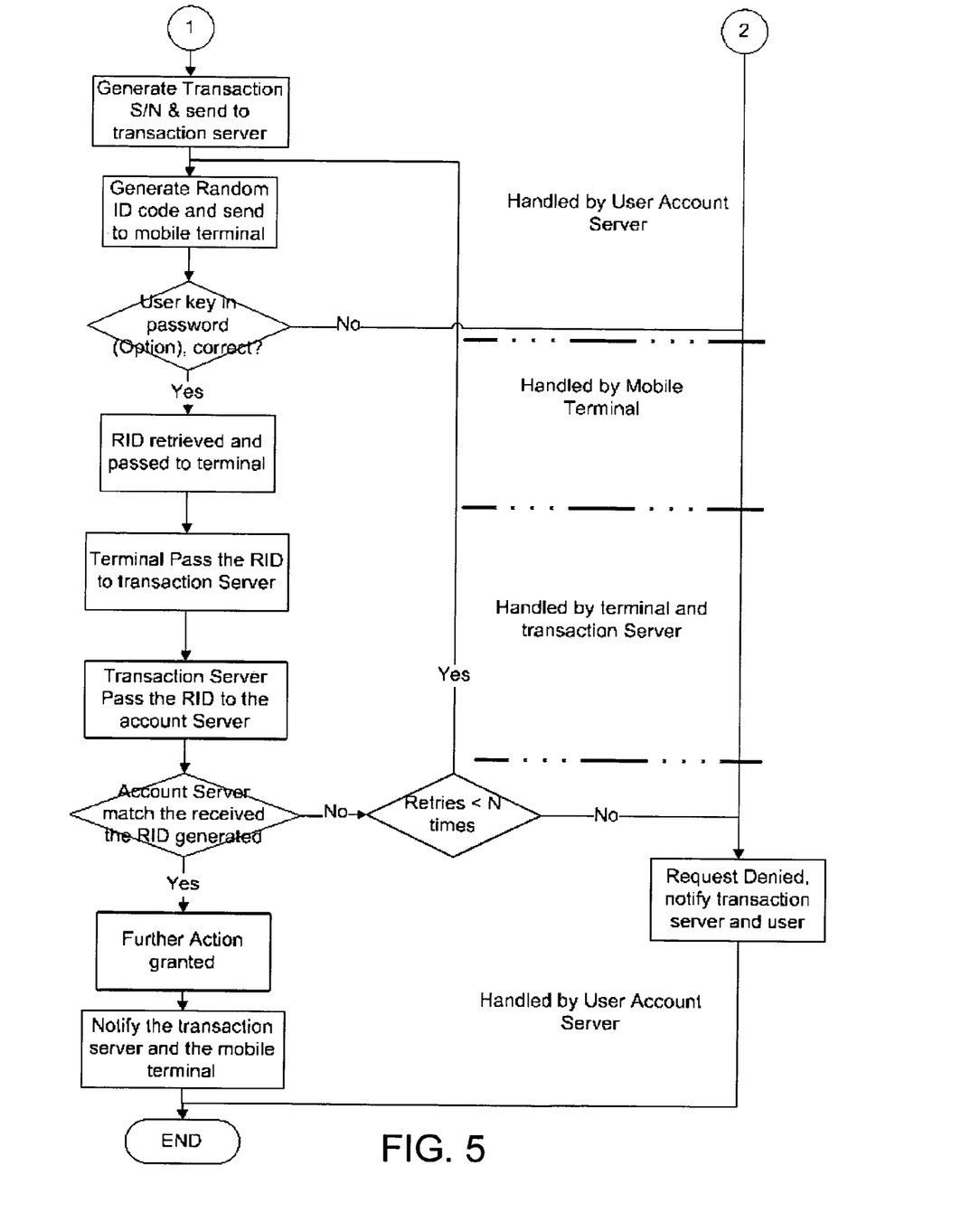

FIG. 4 and FIG. 5 show the flowchart of the preferred embodiment of the present invention. Referring the network configuration of FIGS. 1, 2 and 3, the example sequences of the ID authentication or payment charge method will be explained in detail.

First, a person with a mobile communication tool, such as a mobile phone, subscribes to a service provide, such as his/her wireless carrier say Verizon, or a third party who's going to authenticate the person or authorize an action/transaction say direct a payment through debit or credit account. The service provider for payment can be a debit/credit account issuer like MBNA or an essential account verifier such as VISA international. In the case of ID authentication for secure access, many times a private party which holds both the user and terminal account is involved.

After subscription, the mobile terminal can interface with a transaction terminal when an authentication or authorization is needed. The account number and the service provider ID (if multiple service providers are available) are passed to the transaction terminal. There are several ways to pass this information:

(a) Manually input.

(b) A barcode which contains both the account and server information is provided to the user as a label than can be sticked on the mobile or an image that can be display on a screen, the terminal can scan the barcode to get the information; and/or (c) The information is saved in the mobile phone's non-volatile memory, such as flash, and then can be passed to the terminal wirelessly (Infrared or near field RF).

(d) Manetic card, and/or other contact or contactless methods.

After the transaction terminal receives the account information, it will send them to the transaction server. The transaction server may needs to locate the service provider from a third party if it doesn't have the service provider's information.

The transaction server sends the user account information, terminal information and the action request to the account server. The account server will verify the user's account information, check the terminal's credibility, and verify the feasibility of the action request. If it's an access request, the server will check if the user has the right of accessing the specified the resource. If it's a payment request, the server will check if the account has enough balance or credit line for paying the request amount of money.

After the server verifies every thing, it will generate a Random ID code. This RID code is the core element of the authentication process. This RID will be sent to the mobile terminal. The account serer also sends a transaction sequence number back to the transaction server referring the current transaction request. This sequence number can also be generated by the transaction server and sent to the account server with the action requestion.

To prevent mishandling of a lost mobile terminal, the account server may require the user to key in a password to retrieve the RID. The password can be either sent back to the account server or handled internally inside the mobile terminal. There are numerous ways of detecting the mobile terminal lost or personation. They are not covered in this application. When a mobile terminal is determined as lost or misused, the account server will lock the account for any further action until contacting the user for clarification.

The mobile wireless network can easily find out if there's a personate mobile terminal if two different base stations (not adjacent to each other) report the presentation of the same terminal ID (such as the phone number). Another way to detect terminal personation is to send an ID request to the terminal. The terminal should response back with the correct ID and a random number. This random number is generated per ID request. There could be multiple responses to one ID request, but the random number should be the same. If for one ID request, two different random numbers were received. The network can determine there's a personate terminal.

After received by the mobile terminal, the RID will be passed to the transaction terminal by method discussed before (manual key in, RF, barcode, and etc.). When the transaction server receives the RID from the transaction terminal, it will pass it back to the account server with the original transaction sequence number. The server check if the received RID is exactly the same as that sent out for this transaction. If yes, the further action will be confirmed. And the server may also check the terminal who sent back the RID is the same one who initialized this transaction.

The RID code can be sent to the mobile terminal by Simple Text Message or through other protocols. The account server can also generate a 2D barcode image based on the RID which can be displayed on the mobile phone and scanned by a terminal.

In addition to the RID information, the account server can optionally send the transaction terminal/server's information to the mobile terminal for review. It's better not to send any sensitive information.

If the account server received a wrong RID or hasn't received it in a certain period, say one minute, it may deny the transaction and lock the user's account. Alternatively the account server may recreates a new RID and then send it through the same path. After tried a specified times and failed, the server may deny the transaction and determine the user's account may be stolen. The account may be locked until contacting the user for clarification.

The key innovation of the present invention is the Random ID generation and circle verification procedure.

Figure 6:
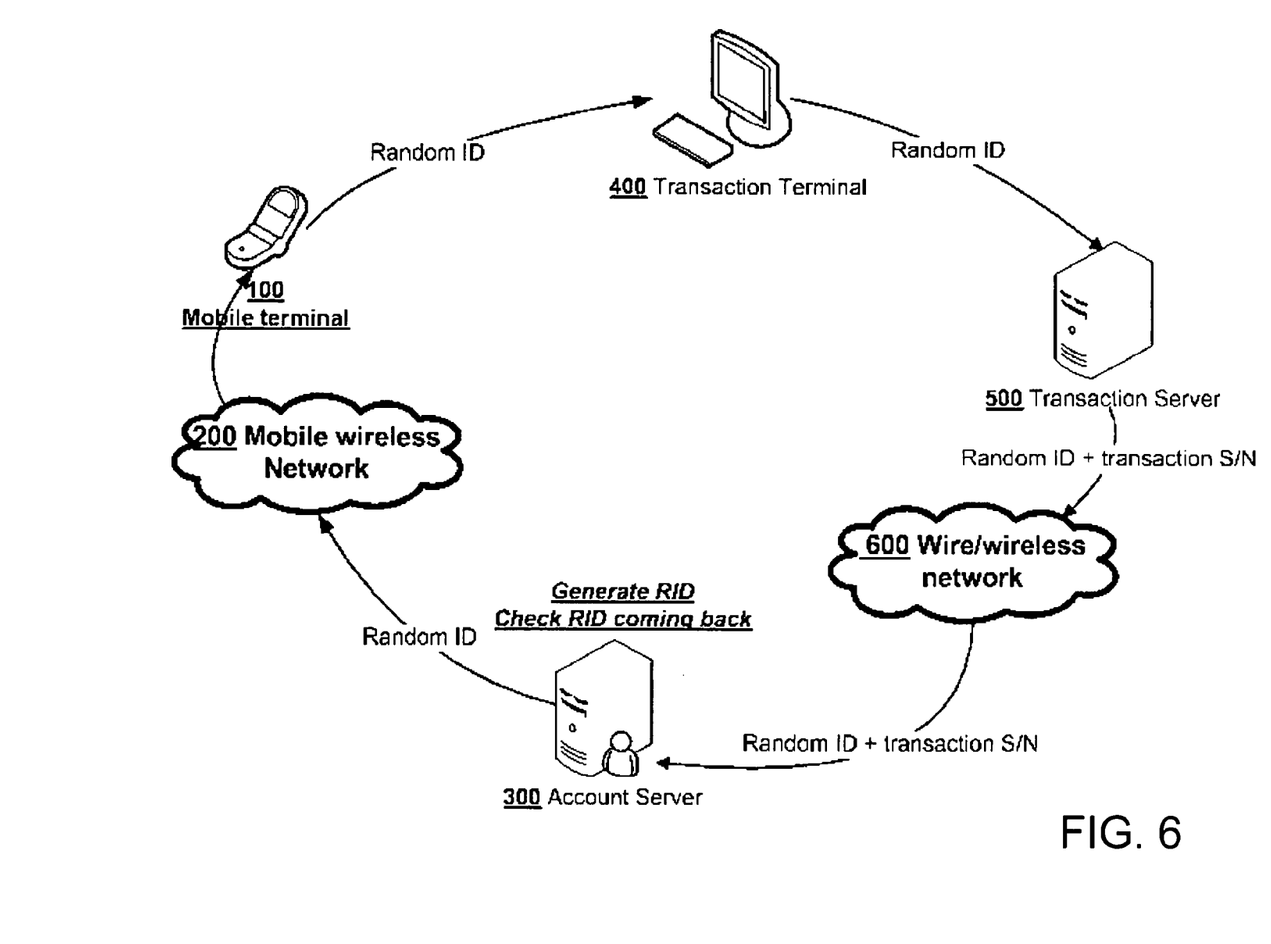
FIG. 6 is the illustration of the RID traveling path.

FIG. 6 shows the travel path of the RID. By sending the RID code through this circle, the account server verifies both the user who carries the mobile terminal and the transaction terminal, which directly interfaces with the mobile terminal and its user. As the RID is complete random and only used once, not even for a short period time, the eavesdropping of the whole process of the transaction is totally useless.

Beside the account server, the transaction server can also be used for generating and verifying RID. And the RID is still being transfer through the circle.

Figure 7:
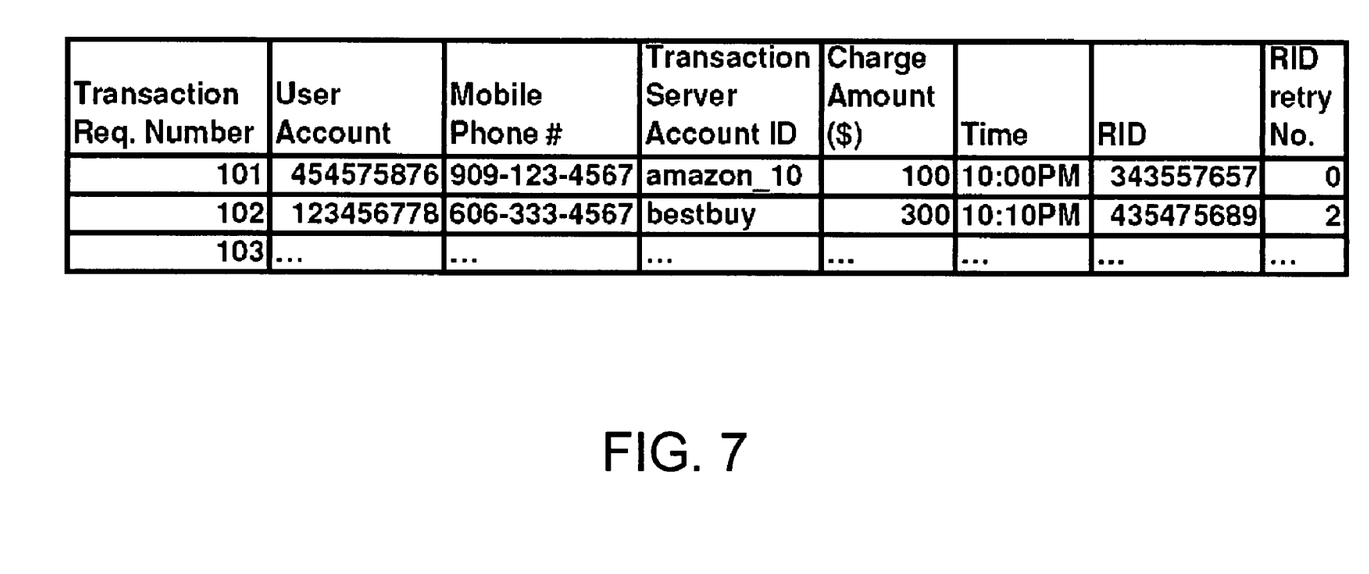
FIG. 7 is the illustration of a possible embodiment of the pending transaction records for online credit card payment.

FIG. 7 shows a possible embodiment of pending transaction records and RIDs in the account server. The server will use these records to keep track of all pending transaction. The transaction server can keep these records if it generates the RIDs. It may be simpler to generate the transaction S/N at the same place the RID is generated.

Figure 8:
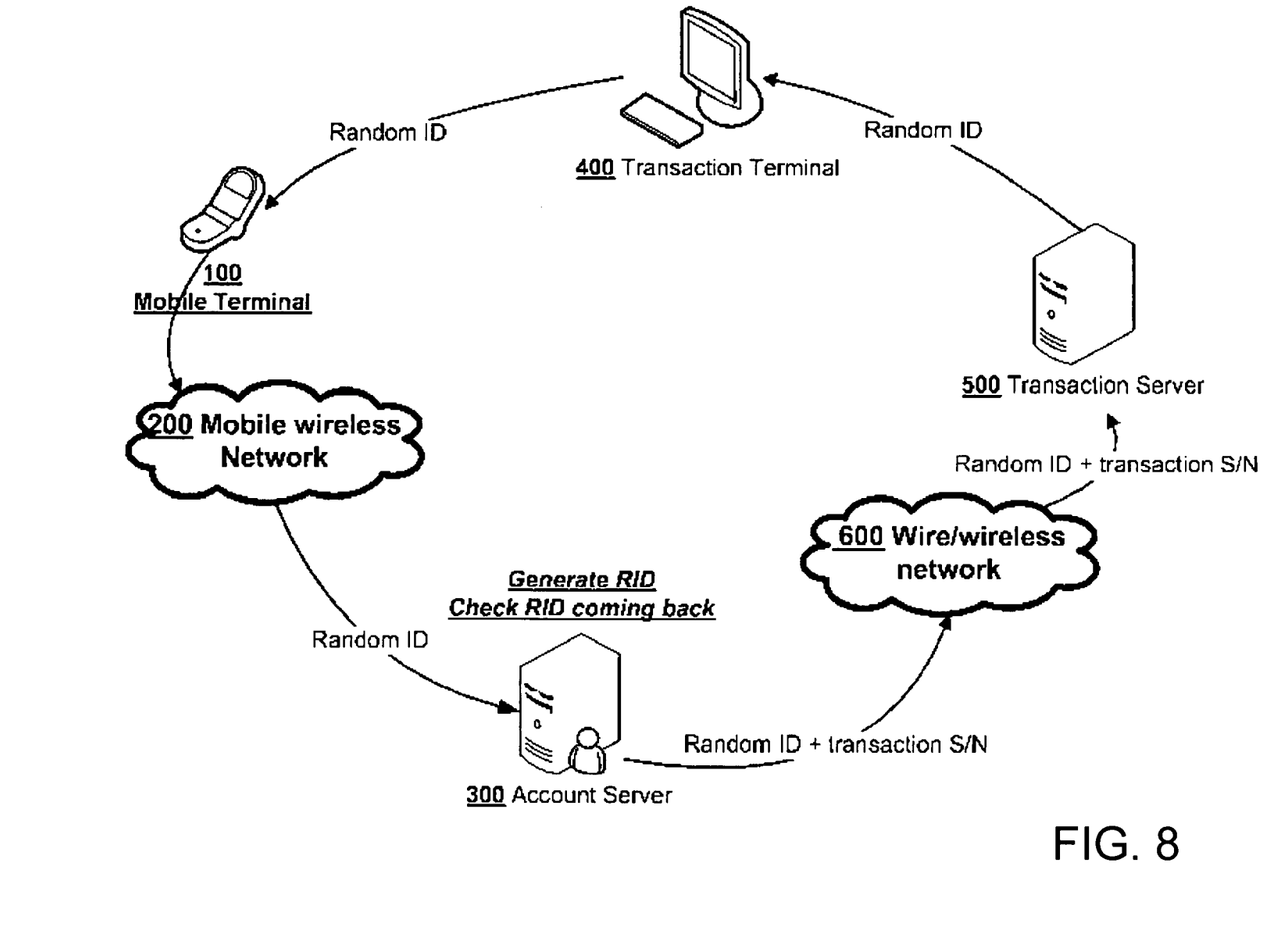
FIG. 8 is the illustration of the alternative embodiment, in which the RID is taking reverse direction.

FIG. 8 shows a way of passing RID reversely. The RID is generated in the account server and then sent to the transaction server and terminal. The user's mobile phone passes the RID received from the terminal to the account server for verification.

Figure 9:
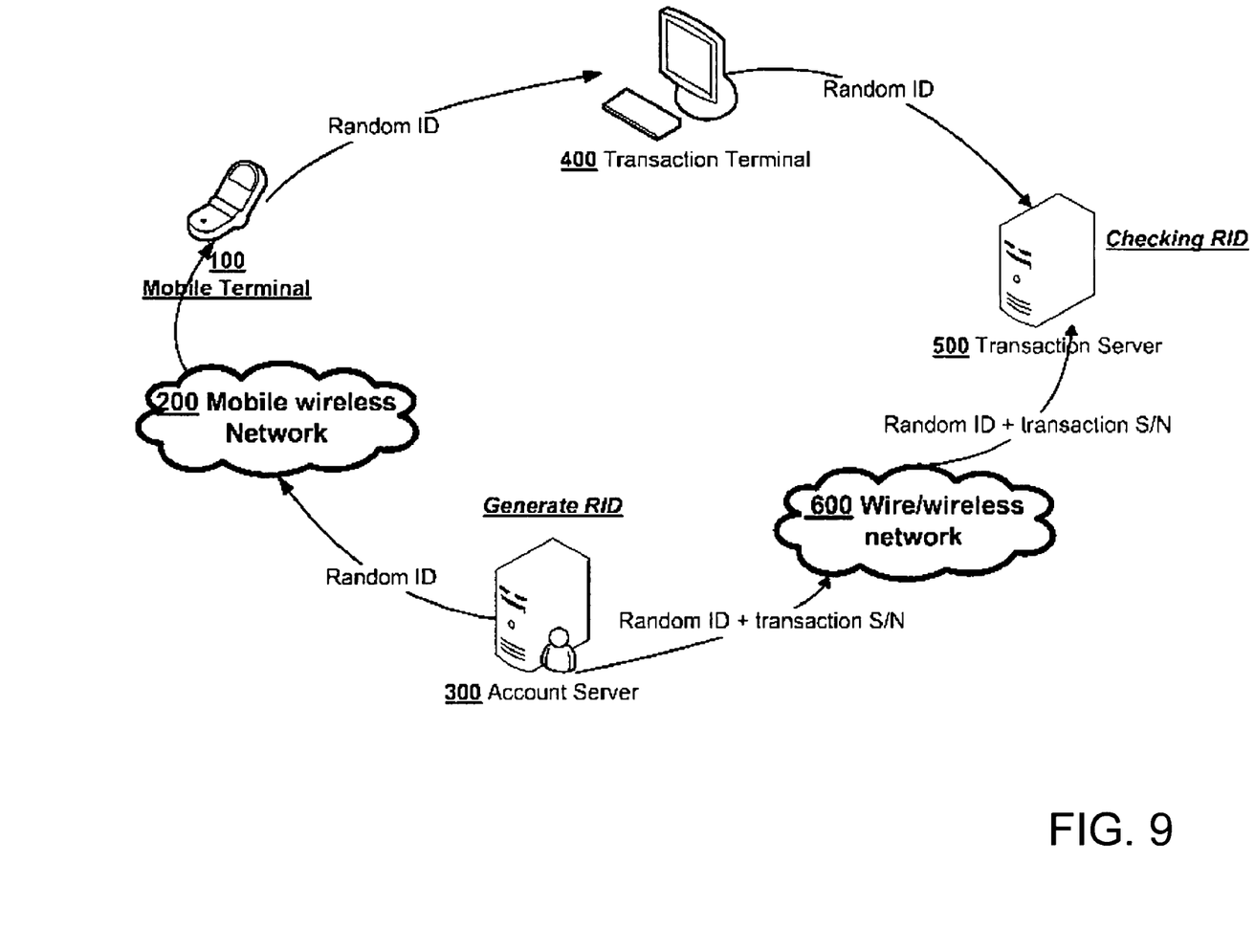
FIG. 9 is the illustration of another alternative embodiment, in which the RID is sent from two directions from the generate server and checked by another server.

FIG. 9 shows another alternative RID passing method of sending the RID to both directions. If the account server generates the RID, the RID will be sent to the transaction server and the mobile terminal. The transaction server will perform the RID verification instead of the account server. If the transaction server generates the RID, the RID will be sent to the account server and the mobile terminal. The account server performs the RID verification.

There is a way of not using RID but still taking advantage of the mobile wireless network. The account server can call the mobile terminal and prompt confirmation of the ongoing transaction. This method demands human intervening and can not be fully implemented electronically. And there is sensitive transaction and account information sending to the mobile phone. Even a special design of secured link may still be vulnerable to some eavesdropping practices. It is also inconvenient and not user friendly as the user has to confirm all the detail transaction information.

There may be more than two servers involving a transaction. For example, the account server may request a third party, the mobile phone's wireless carrier or a security service provider, to generate, send and verify the RID and return authentication to the account server.

Figure 10:
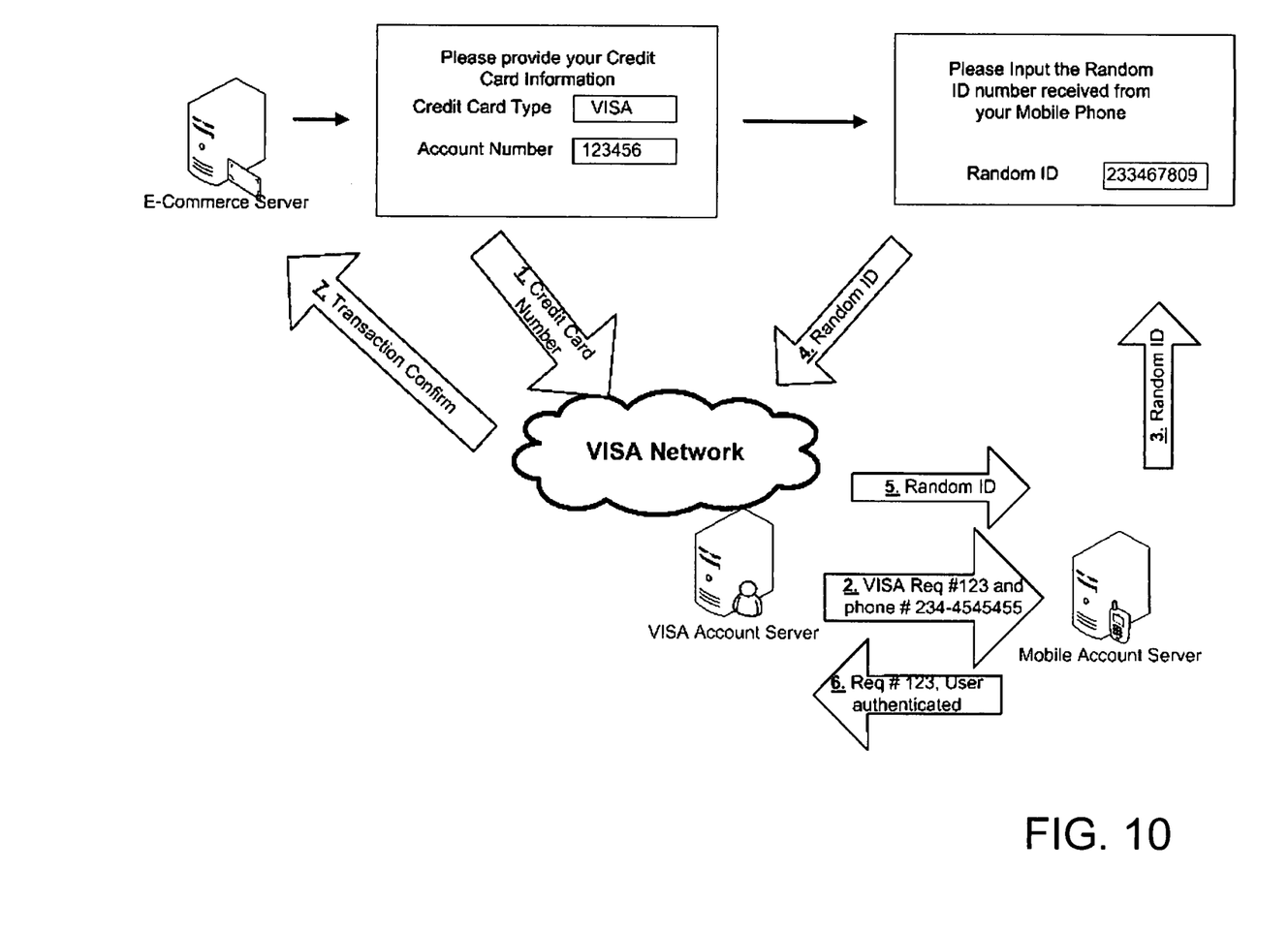
FIG. 10 is the illustration of the example of the application of the online credit card payment.

FIG. 10 shows an example of online credit card payment:

1. The e-commerce server prompts the buyer to input the credit card type and credit card number. Based on the credit card type, the server will send a request to the specified credit card network, say VISA network. This request will be first sent to the card issuer and then to VISA's account server;

2. VISA account server verify the credit number and find out the associated mobile phone number to this credit card (the VISA card issuer, say MBNA, or VISA itself may keep this information). The account server send an authentication request with the user's mobile phone number and a request number to the user's mobile network carrier, say Verizon;

3. The mobile account server of Verizon receives the request and generates a RID and sends the user's mobile phone;

4. This RID will be input into the e-commerce web page and sent back to the VISA account server;

5. VISA account server send the RID and original request number back to the mobile account server;

6. The mobile account server check if the RID received matches to the one saved for the specified request number. If match, it send a authentication message back to the VISA account server; FIG. 8 shows a possible implementation of a pending transaction table kept in the account server database for online credit card payment. The account server retrieves the original RID by looking after this table. There could be more columns in this table; and 7. The VISA account server will confirm the transaction.

The credit card issuer can verify and authenticate the user account before sending information to VISA's account server. It will send the authentication request to the mobile phone carrier.

The mobile phone carrier can itself be a credit card issuer, so the whole verification and authentication processes can be done with its account server.

| Definition List 1 | |
|---|---|
| Term | Definition |
| Random ID code (RID) | A code that is generated randomly as a identification number passed to the mobile phone |
| RID Circle Authentication | The RID travel through a circle path of originate server, mobile, terminal and transaction server. By going through the circle, the account server verifies the elements on the whole path. The RID can travel from one direction and return to the start point. It also can travel on two direction from one point and meet at another point on the circle. |
| Transaction Terminal | User interface of the transaction server |
| Transaction Server | The server which process the transaction request coming from the terminal and send the request to the account server. |
| Account Server | The server which holds the user's account information and mobile phone number. |
| Mobile Terminal | A Mobile communication tool within a mobile wireless network. |

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A system of ID authentication for an electronic payment between a user and a business entity, comprising an authentication circle path of public network, which comprises:

a portable mobile terminal carried by said user of said authentication circle path of public network, wherein said user is given subscribed user account information;

an account server which comprises:

a network interface which is arranged to communicate with said mobile terminal via a mobile wireless network;

a random ID generator adapted for generating a random identification (RID) code for each pending transaction; and a database containing said subscribed user account information, subscribed terminal account information, transaction records and pending transactions with said corresponding RID;

a transaction terminal adapted for interactively communicated with a user of said portable mobile terminal; and a transaction server communicated with said transaction terminal and said account server, wherein said transaction terminal an said transaction server are maintained by said business entity which is given said terminal account information, in such a manner that when said user wishes to conduct a secured transaction with said business entity as said pending transaction, said transaction is verified by the following procedures:

(a) said user account information is transmitted to said transaction terminal which then transmits said user account information to said transaction server, (b) said transaction server then sends said user account information and said terminal information to said account server;

(c) said account server verifies said user account information from said database;

(d) after said user account information is verified, said random ID generator if said account server is arranged to generate said RID code for said pending transaction, wherein said RID code is sent to said mobile terminal said network interface;

(e) said account server sends a corresponding transaction sequence number to said transaction server referring said corresponding pending transaction;

(f) said RID code received by said mobile terminal is transmitted to said transaction terminal which transmits said RID code to said transaction server, wherein when said transaction server receives said RID code from said transaction terminal, said transaction server transmits said RID code back to said account server with said original transaction sequence number; and (g) said account server is then arranged to verify if said received RID code is exactly the same as that sent out for said corresponding pending transaction, wherein further transaction processes proceed if said received RID code is the same as said RID code sent out by said account server.

2. The method, as recited in claim 1, wherein said step (d) further comprises the steps of:

(d.1) generating said Random ID (RID) code;

(d.2) saving said RID code with a transaction detail including a transaction sequence number, a user account, a terminal account, and a request action;

(d.3) sending said RID code to said mobile terminal;

(d.4) providing an option for said user to enter a password to retrieve said RID code; and (d.5) retrieving and passing said RID code to said transaction terminal.

3. The method, as recited in claim 1, wherein said step (e) further comprises the steps of:

(e.1) receiving said RID code from said mobile terminal by said transaction terminal;

(e.2) passing said RID code to said transaction server by said transaction terminal;

(e.3) passing said RID code to said account server with an original sequence number of this transaction by said transaction server; and (e.4) checking by said account server if said received RID code from said transaction server is said same as said one generated for this transaction.

4. The method, as recited in claim 3, wherein in said step (e.1), said RID code is received by said terminal through a communication method selected from a group consisting of Infrared transmission, near field wireless transmission, Bluetooth transmission, radio frequency transmission, microwave transmission and other similar communication methods, wherein said RID code is displayed as a barcode image on said mobile terminal and scanned by said transaction terminal.

5. The method, as recited in claim 4, further comprising a step of sending a picture of said user by said account server to a manned terminal for further verification.

6. The method, as recited in claim 1, further comprising a step of sending a picture of said user by said account server to a manned terminal for further verification.

* * * * *